(12) United States Patent
Wegner et al.

(10) Patent No.: US 9,715,056 B1
(45) Date of Patent: Jul. 25, 2017

(54) LIGHTGUIDE EDGE OPTIC

(71) Applicant: Cooper Technologies Company, Houston, TX (US)

(72) Inventors: Scott David Wegner, Peachtree City, GA (US); Jerold Alan Tickner, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 123 days.

(21) Appl. No.: 14/724,384

(22) Filed: May 28, 2015

Related U.S. Application Data (60) Provisional application No. 62/005,347, filed on May 30, 2014.

(51) Int. Cl.
*G02B 6/00* (2006.01)
*F21V 8/00* (2006.01)
*G02B 3/00* (2006.01)
*F21V 7/00* (2006.01)

(52) U.S. Cl.
CPC ........... *G02B 6/005* (2013.01); *G02B 3/0006* (2013.01); *G02B 6/0063* (2013.01); *F21V 7/0091* (2013.01)

(58) Field of Classification Search
CPC .... G02B 3/0006; G02B 6/005; G02B 6/0063; G02B 6/0055; G02B 6/0045; G02B 6/0028; F21V 7/0091; F21V 7/0008; F21V 7/0016; F21K 9/61
USPC ................ 362/606, 555, 607, 558, 608, 147
See application file for complete search history.

(56) References Cited

U.S. PATENT DOCUMENTS

| | | | | |
|---|---|---|---|---|
| 5,581,683 A * | 12/1996 | Bertignoll | ............ | G02B 6/0003 362/558 |
| 7,329,029 B2 * | 2/2008 | Chaves | .................... | G02B 3/06 257/E33.071 |
| 8,425,076 B2 * | 4/2013 | Lockwood | ................ | B64F 1/20 362/153.1 |
| 8,672,518 B2 * | 3/2014 | Boomgaarden | ......... | F21S 8/026 362/147 |
| 8,960,980 B2 * | 2/2015 | Tsai | ..................... | G02B 6/0008 362/551 |
| 8,998,478 B2 * | 4/2015 | McCollum | ................ | F21S 8/06 362/147 |
| 9,062,849 B2 * | 6/2015 | Gennetten | ................. | F21V 5/02 |
| 9,081,125 B2 * | 7/2015 | Dau | ........ | F21V 7/0008 |
| 2012/0236586 A1 * | 9/2012 | Wang | .................... | F21V 29/006 362/555 |
| 2015/0301260 A1 * | 10/2015 | York | ..................... | F21V 7/0016 362/607 |
| 2016/0139316 A1 * | 5/2016 | Speier | ................ | G02B 27/0994 362/607 |

* cited by examiner

*Primary Examiner* — Ann Mai
*Assistant Examiner* — Arman B Fallahkhair
(74) *Attorney, Agent, or Firm* — King & Spalding LLP (57) ABSTRACT

A lighting system can comprise an edgelit panel, for example a lightguide that may have a panel or slab shape with an edge that receives light from an array of light emitting diodes extending along the edge. The lightguide can guide the received light towards an opposing edge of the lightguide and gradually release light to provide illumination. An optic can manage light that reaches the opposing edge of the lightguide, for example via softening, spreading, concentrating, or diffusing the light. The optic can have a tubular shape and may have lengthwise extending features for light management.

19 Claims, 6 Drawing Sheets

LIGHTGUIDE EDGE OPTIC

CROSS REFERENCE TO RELATED APPLICATIONS

This application claims priority to U.S. Provisional Patent Application No. 62/005,347 filed May 30, 2014 in the name of Scott David Wegner and Jerold Alan Tickner and entitled "Lightguide Edge Optic," the entire contents of which are hereby incorporated herein by reference.

TECHNICAL FIELD

Embodiments of the technology relate generally to a lighting apparatus that includes a lightguide, and more particularly a panel-shaped lightguide to which an edge-mounted optic is attached.

BACKGROUND

Light emitting diodes (LEDs) offer substantial potential benefit for illumination applications associated with energy efficiency, light quality, and compact size. However, to realize the full potential of the benefits offered by light emitting diodes, new technologies are needed. For example, when one or more light emitting diodes are coupled to a lightguide in connection with distributing or managing light for illumination, the light can emerge from the lightguide unevenly or with hotspots.

Accordingly, there are needs in the art for technology to manage light produced by one or more light emitting diodes. Need exists for a technology to avoid hot spots or uneven distribution when light is coupled into and carried by a lightguide in connection with illumination. Need further exists for a technology to improve the distribution of illumination from a lightguide, including softening the illumination. A capability addressing one or more such needs, or some other related deficiency in the art, would support improved illumination systems and more widespread utilization of light emitting diodes and/or lightguides in lighting applications.

SUMMARY

A lightguide can have a shape of a panel, a slab, a plate, or similar form comprising two major faces. Light can be introduced into the lightguide via an edge that extends between the two major faces. The light can propagate in the lightguide via internal reflection from the two major faces, traveling from the introduction or entrance edge towards an emission edge. Illumination light can escape from the lightguide through the major faces and through the emission edge. A tubular optical element can be attached to the emission edge to soften, diffuse, spread, or otherwise manage light emitted from that edge.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

A tubular optical element can clamp or otherwise attach onto a lightguide to diffuse or otherwise control light propagating through an edge of the lightguide. The lightguide can comprise an edgelit panel, for example. The tubular optical element can comprise an interior surface that forms a cavity and an exterior surface that is opposite the interior surface, with a wall between the interior and exterior surfaces. The tubular optical element and the cavity can extend lengthwise along the edge of the lightguide. The light emitted at the lightguide edge can be incident upon the interior surface. After incidence on the interior surface, the light can propagate through the wall of the tubular optic and can exit the tubular optic through the exterior surface. The interior surface or the exterior surface can comprise surface features that refract the incident light to provide diffusion or to reduce glare. The surface features can comprise lenslets or a Blondel array, for example.

Some representative embodiments will be described more fully hereinafter with example reference to the accompanying drawings that illustrate embodiments of the technology. In the drawings, FIG. 1 describes a representative operating environment, in the form of a luminaire; FIGS. 2 and 3 describe some representative lightguides and associated edge optics; and FIGS. 4 and 5 describe some additional representative edge optics. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 1:
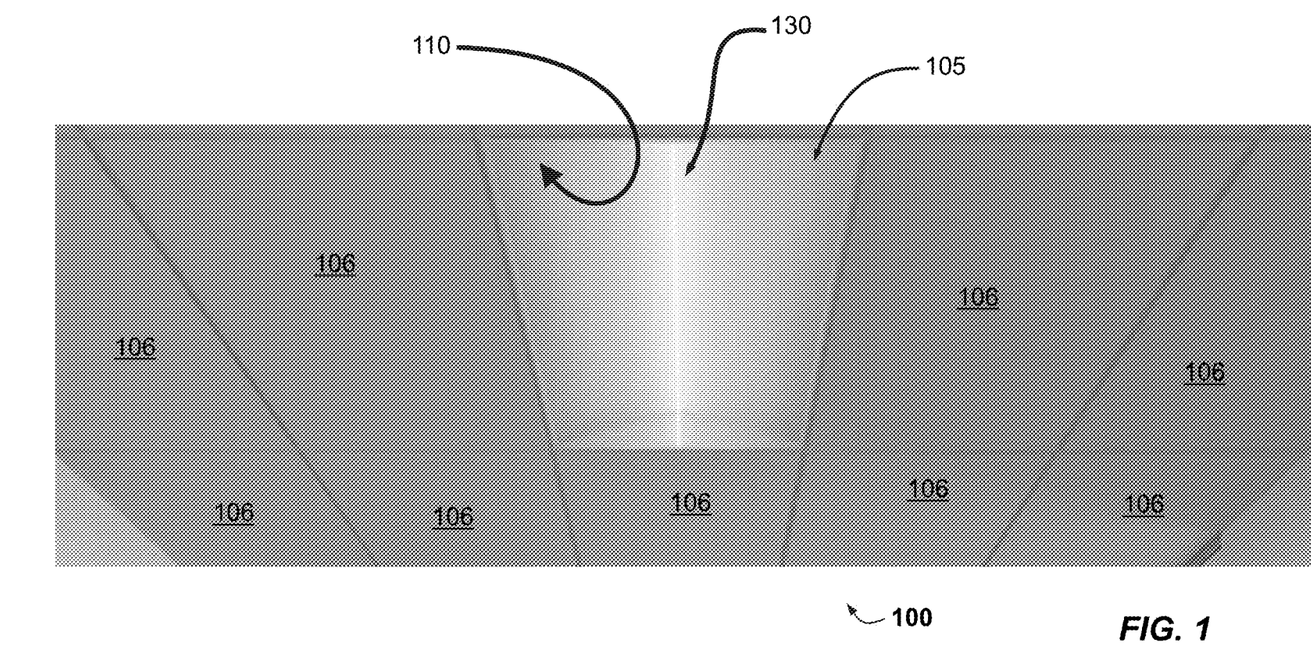
FIG. 1 illustrates a suspended ceiling of a room with a grid of ceiling panels and an example luminaire according to some embodiments of the disclosure.

Turning now to FIG. 1, this figure illustrates a suspended ceiling 100 of a room with a grid of ceiling panels 106. A luminaire 105 is mounted in the grid, in place of a ceiling panel. The luminaire 105 comprises a vertically oriented lightguide system 130 that emits light laterally and downward to illuminate the room. The luminaire 105 also comprises a curved reflector 110 that forms a cavity in which the lightguide system 130 is mounted.

A light source, for example a row of light emitting diodes (LEDs), couples light into an upper edge of the lightguide system 130. The coupled light propagates in the lightguide system and emits laterally and downward from the lightguide system 130. A portion of the lateral light is incident upon the curved reflector 110. The curved reflector 110 directs that incident light into the room for useful illumination. The curved reflector 110 may comprise a diffusely reflective surface or alternatively a specularly reflective surface. As will be discussed in further detail below, the lightguide system 130 can comprise an edge optic that reduces glare.

The term "edge optic," as used herein, generally refers to an optic that manages light flowing into or out of an edge of a lightguide.

Figure 2A:
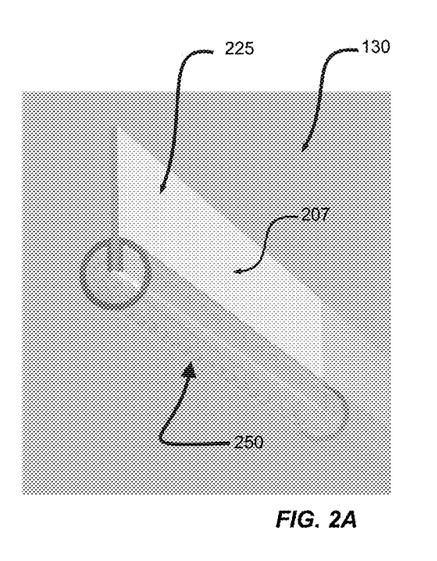
FIGS. 2A, 2B, 2C, and 2D (collectively FIG. 2) illustrate an example embodiment of a lightguide system that comprises a lightguide and an associated edge optic and that may be incorporated in the luminaire of FIG. 1 according to some embodiments of the disclosure.
Figure 2B:
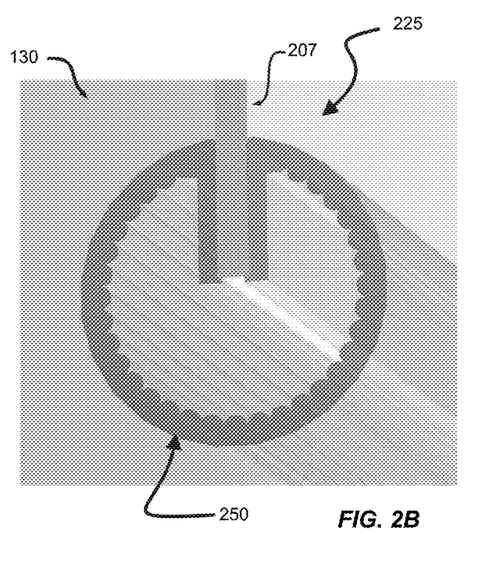
Figure 2C:
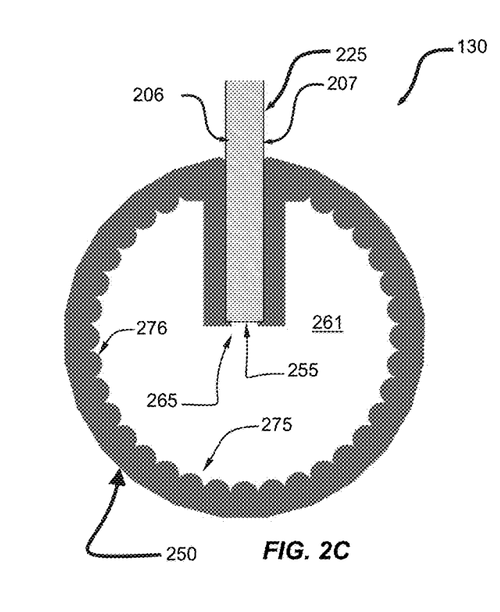
Figure 2D:
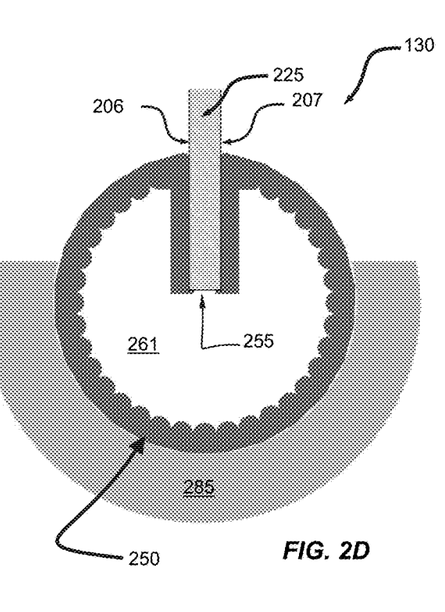

Turning now to FIG. 2, FIGS. 2A, 2B, 2C, and 2D illustrate an example embodiment of the lightguide system 130 discussed above with reference to FIG. 1. FIG. 2A illustrates a perspective view of the lightguide system 130. FIG. 2B illustrates a detail perspective view of the lightguide system 130. FIG. 2C illustrates a detail cross sectional view of the lightguide system 130. In FIG. 2D, a representative emission distribution 285 has been overlaid upon the view of FIG. 2C.

The illustrated lightguide system 130 of FIG. 2 comprises an example lightguide 225 and an example edge optic 250. In a representative application, for example as illustrated in FIG. 1 and discussed above, an array of light emitting diodes is mounted adjacent the upper edge of the lightguide 225. The light emitting diodes couple light into the lightguide 225, and the major faces 206, 207 of the lightguide 225 guide the coupled light generally towards an opposing edge 255 of the lightguide 225 to which the edge optic 250 is attached. The opposing edge 255 provides an exit aperture for the guided light. In some example embodiments, the edge 255 is roughed up or patterned to enhance light diffusion. In some example embodiments, the edge 255 is rough cut or mechanically sanded. In some example embodiments, the edge 255 is polished smooth.

In some embodiments, the major faces 206, 207 of the lightguide 225 can be patterned with microlenses that promote controlled release of light incident on those faces. The microlenses can comprise conical features, truncated cones, convex shapes, or other appropriate features, for example.

In some embodiments, the major faces 206, 207 of the lightguide 225 are unpatterned or smooth so that, relative to a microlensed embodiment, less light escapes through the faces 206, 207, and thus more light reaches the edge optic 250. In some embodiments, release of light from the major faces 206, 207 of the lightguide 225 is minimized so that the amount of light reaching the edge optic 250 is essentially maximized. Accordingly, the lightguide 225 can serve as a conduit for delivering light to the edge optic 250.

In the illustrated embodiment, the edge optic 250 has a tubular shape and extends lengthwise along the edge 255 of the lightguide 225. The illustrated edge optic 250 provides one example embodiment of a tubular optical element. The edge optic 250 has an interior surface 276 that faces the lightguide edge 255 and forms or lines a cavity 261. As illustrated, the interior surface is patterned with refractive optical features 275 that spread or diffuse incident light emitted at the edge 255. In various example embodiments, the refractive optical features 275 can comprise a Blondel array, lenslets, grooves extending lengthwise, convex surfaces, concave surfaces, an irregular pattern, features having a triangular profile, symmetric surfaces, asymmetric surfaces, or some other appropriate profile or geometry. In various example embodiments, the refractive optical features 275 may collectively or individually spread, concentrate, focus, diverge, scatter, or otherwise manipulate light.

As illustrated, when viewed in cross section, the edge optic 250 follows a circular profile but stops short of closing on itself when installed on the lightguide 225. Thus, in the illustrated embodiment, the edge optic 250 extends circumferentially slightly less than 360 degrees of arc, resulting in a gap 265 aligned with the edge 255 of the lightguide 225. Most of the light incident on the edge 255 of the lightguide 225 emits from the edge 255 through the gap 265 and thus can propagate unobstructed to the refractive optical features 275 on the interior surface of the edge optic 250 for refractive diffusion. (Alternatively, in some embodiments, the edge optic 250 may close complete on itself so that the gap 265 is nonexistent.)

FIG. 2D illustrates a representative emission distribution 285. In the illustrated example embodiment, the emission distribution 285 extends greater than 180 degrees around the circumference of the edge optic 250. In some embodiments, the emission distribution extends between 180 degrees and 270 degrees around the circumference of the edge optic 250. In some example embodiments, the emission distribution extends less than 180 degrees around the circumference of the edge optic 250. In some example embodiments, the emission distribution extends between 180 degrees and 360 degrees around the circumference of the edge optic 250.

In some embodiments, when the edge optic 250 is not mounted on the lightguide 250, the gap 265 closes partially or fully. In other words, when the edge optic 250 is in a mechanically relaxed state (for example prior to installation on the lightguide 250), the gap 265 pinches partially or fully closed. Thus, when the edge optic 250 is mounted as illustrated, the edge optic 250 exerts clamping force on the lightguide 225 for retention. Accordingly, in some embodiments, the edge optic 250 clamps or pinches onto the lightguide 225. In some embodiments, the edge optic 250 is glued, bonded, or fastened to the lightguide 225 for retention without such clamping force.

In some embodiments, the edge optic 250 is installed on the lightguide 250 at the factory. In some embodiments, the edge optic 250 is field installed by a technician or other field personnel. In some embodiments, the edge optic 250 is applied to an installed luminaire, for example in a retrofit scenario.

In some example embodiments, the edge optic 250 comprises a plastic optical material such as PMMA acrylic, polystyrene, or optical grade polycarbonate, to mention a few representative examples without limitation. In some example embodiments, the edge optic 250 comprises silicone or another appropriate elastomer. In some example embodiments, such optical materials may be clear. In some example embodiments, such optical materials may comprise scattering additives, fine particles, or a diffusion agent. Such materials may be distributed throughout the body of the edge optic 250 or alternatively concentrated in a region, for example applied as a surface treatment. In some example embodiments, the edge optic 250 is translucent or is frosted.

Figure 3A:
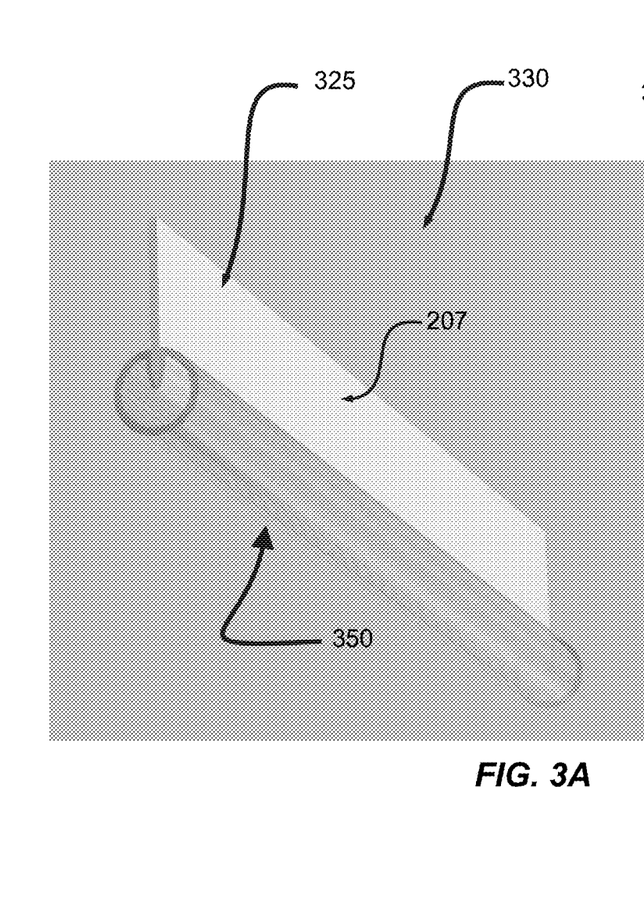
FIGS. 3A, 3B, 3C, and 3D (collectively FIG. 3) illustrate an example embodiment of a lightguide system that comprises a lightguide and an associated edge optic and that may be incorporated in the luminaire of FIG. 1 according to some embodiments of the disclosure.
Figure 3B:
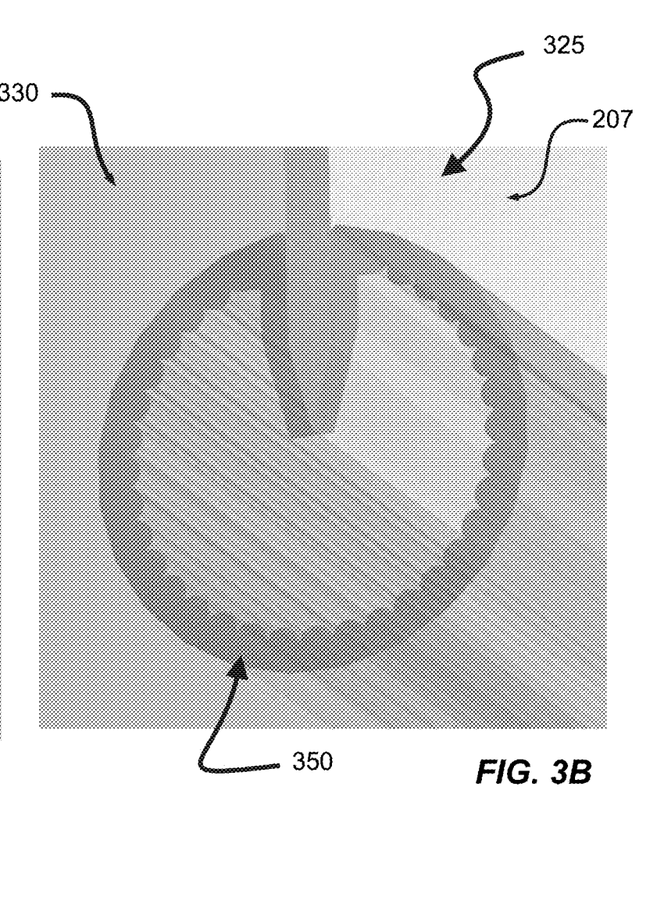
Figure 3C:
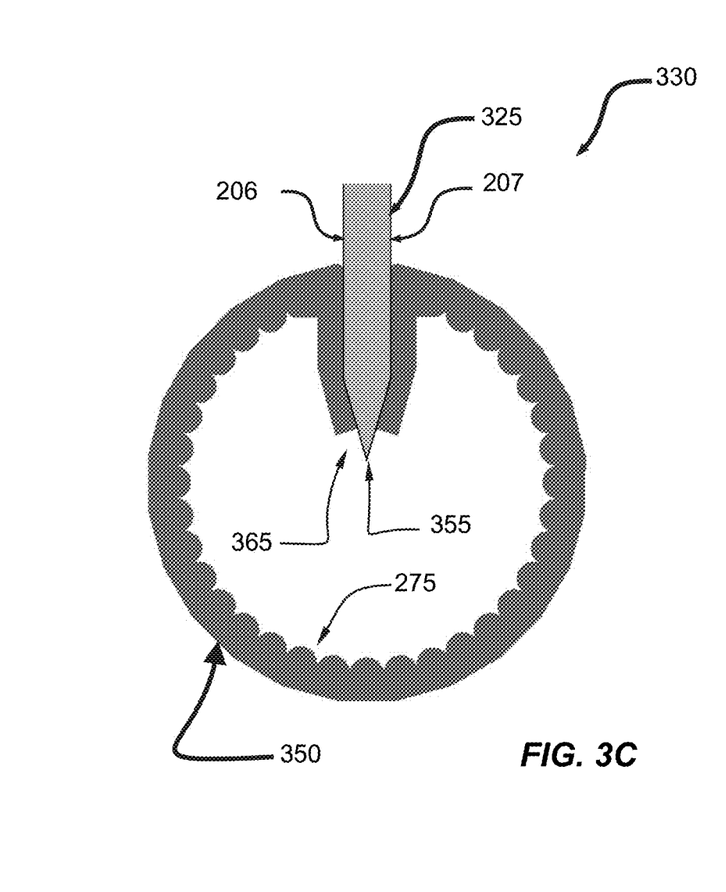
Figure 3D:
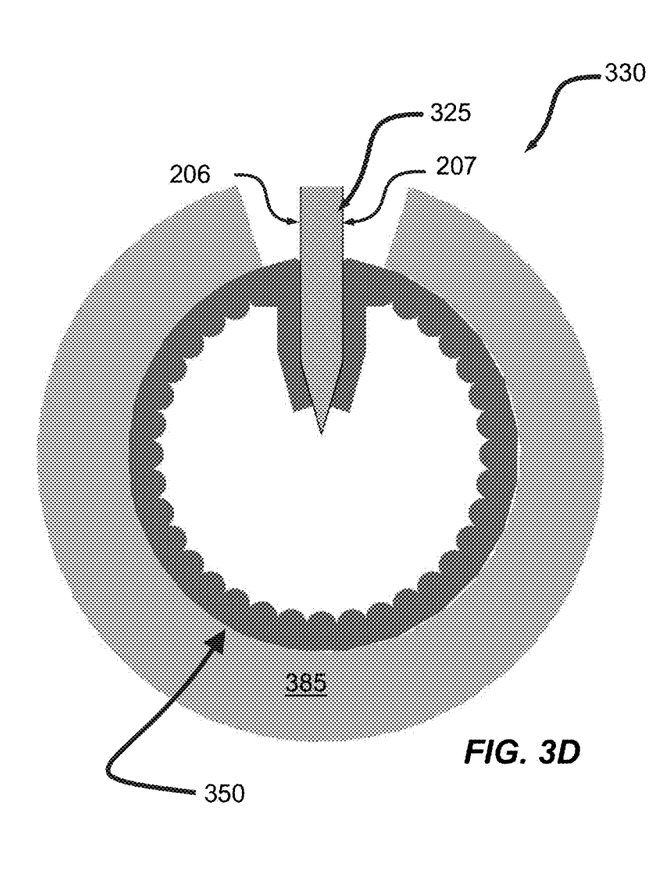

Turning now to FIGS. 3A, 3B, 3C, and 3D, another example lightguide system 330 is illustrated. The lightguide system 330 may be utilized in various lighting fixtures and applications, including but not limited to the overhead lighting installation illustrated in FIG. 1 and discussed above. FIG. 3A illustrates a perspective view of the lightguide system 330. FIG. 3B illustrates a detail perspective view of the lightguide system 330. FIG. 3C illustrates a detail cross sectional view of the lightguide system 330. In FIG. 3D, a representative emission distribution 385 has been overlaid upon the view of FIG. 3C.

In the illustrated embodiment, the lightguide system 330 comprises a lightguide 325 and an edge optic 350. The illustrated edge optic 350 provides one example embodiment of a tubular optical element. Similar to the lightguide system 130 illustrated in FIG. 2 and discussed above, light is injected into an upper edge of the lightguide 325. The injected light is guided towards the lower edge 355 by internal reflection off of the major faces 206, 207 of the lightguide 325.

As discussed above with reference to FIG. 2, in some example embodiments, one or both of the major faces 206, 207 can be patterned with microlenses to facilitate a controlled release of light through the major faces 206, 207. The light released through the major faces 206, 207 can be reflected downward, into an area to be illuminated, by reflective surfaces 105 of a luminaire 100, for example discussed above with reference to FIG. 1.

The lower edge 355 of the example lightguide 325 illustrated in FIG. 3 is tapered, for example to provide a triangular form when viewed in cross section. Accordingly, in the illustrated embodiment, the edge 355 is pointed. In some embodiments, the edge 355 is pointed, but the point is blunted or rounded. The edge optic 350 embraces the tapered edge 355 and provides a gap 365 corresponding to the gap 355 illustrated in FIG. 2 and discussed above.

The tapered edge 355 forms an exit aperture for the lightguide 330 that provides a broad emission distribution 385 as illustrated in FIG. 3D. Thus, the emission distribution 285 produced by the flat, un-tapered edge 255 (as illustrated in FIG. 2) is narrow relative to the emission distribution 385 produced by the tapered edge 355 of the embodiment of FIG. 3. As compared to the emission distribution 285, the emission distribution 385 illustrated in FIG. 3D emits more light upward. The broadened emission distribution 385 provided by the tapered edge 355 decreases the luminance of the lightguide exit aperture, helping to further reduce glare for some example applications.

In the illustrated example embodiment of FIG. 3D, the emission distribution 385 extends greater than 270 degrees around the circumference of the edge optic 350. In some embodiments, the emission distribution extends 360 degrees around the circumference of the edge optic 350. In some example embodiments, the emission distribution extends between 315 degrees and 360 degrees around the circumference of the edge optic 350. In some example embodiments, the emission distribution extends between 325 degrees and 355 degrees around the circumference of the edge optic 350.

In some example embodiments, the lower, tapered edge 355 of the lightguide 325 is roughed up or patterned to enhance light diffusion. In some example embodiments, the lower, tapered edge 355 is rough cut or mechanically sanded. In some example embodiments, the lower, tapered edge 355 is formed by a grinding or machining operation. In some example embodiments, the lower, tapered edge 355 is polished smooth. In some example embodiments, the lower, tapered edge 355 is created when the lightguide 325 is initially fabricated, for example during casting, molding, or extrusion. In some embodiments, a coating is applied to the tapered surfaces of the edge 355, for example a layer of particles or a coating of light-diffusing paint.

Figure 4:
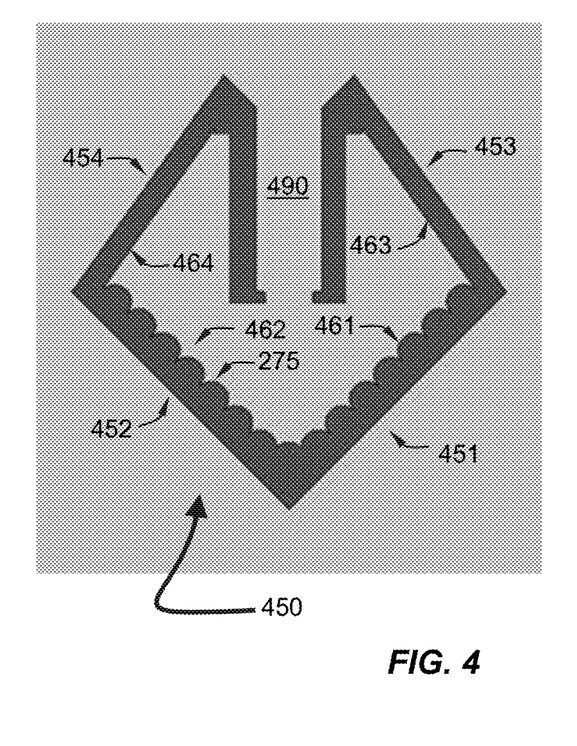
FIG. 4 illustrates an example edge optic that may be coupled to a lightguide for utilization in a luminaire, such as the luminaire depicted in FIG. 1, according to some embodiments of the disclosure.

Turning now to FIG. 4, another example embodiment of an edge optic 450 is illustrated. The illustrated edge optic 450 provides one example embodiment of a tubular optical element. FIG. 4 illustrates a cross sectional view of the edge optic embodiment 450. In cross section, the illustrated edge optic 450 has four exterior flat sides 451, 452, 453, 454, specifically a quadrilateral form. Various example geometric forms may be octagonal, diamond-shaped, hexagonal, polygonal, triangular, oval, semicircular, or some other appropriate shape.

The edge optic 450 comprises two lower interior sides 461, 462 that are respectively opposite the two lower exterior sides 451, 452. As illustrated, the two lower interior sides 461, 462 are patterned with refractive optical features 275 that extend lengthwise (into the page) and that spread or diffuse incident light. Other embodiments may extend laterally. In various example embodiments, the refractive optical features 275 can comprise a Blondel array, lenslets, grooves extending lengthwise, convex surfaces, concave surfaces, an irregular pattern, features having a triangular profile, symmetric surfaces, asymmetric surfaces, or some other appropriate profile or geometry. In various example embodiments, the refractive optical features 275 may collectively or individually spread, concentrate, focus, diverge, scatter, or otherwise manipulate light.

The illustrated edge optic 450 further comprises two upper interior sides 463, 464 that are respectively opposite the two upper exterior sides 453, 454. In the illustrated embodiment, the two upper interior sides 463, 464 are smooth. In other embodiments the interior sides 463, 464 may be patterned with refractive optical features like the lower interior sides 461, 462, roughed up, or patterned with some other appropriate texture, features or form.

The edge optic 450 of FIG. 4 further comprises a lengthwise extending slot 490 that is sized to receive a lightguide edge, for example the edge 255 of the lightguide 225 illustrated in FIG. 2 as discussed above. In some embodiments, the slot 490 is formed to receive a tapered lightguide edge, for example as illustrated in FIG. 3. The slot 490 can comprise a corresponding taper, for example.

Figure 5:
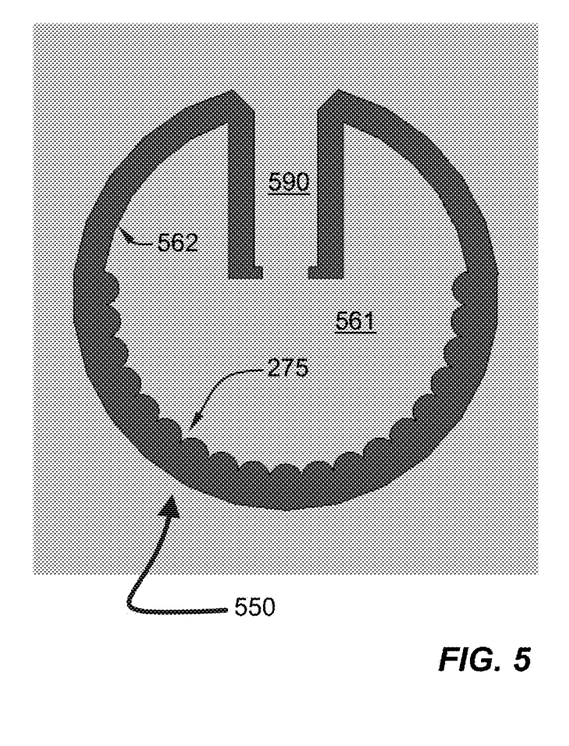
FIG. 5 illustrates another example edge optic that may be coupled to a lightguide for utilization in a luminaire, such as the luminaire depicted in FIG. 1, according to some embodiments of the disclosure.

Turning now to FIG. 5, another example embodiment of an edge optic 550 is illustrated. The illustrated edge optic 550 provides one example embodiment of a tubular optical element. FIG. 5 illustrates a cross sectional view of the edge optic 550. The edge optic 550 thus extends into the page, so that when mounted on a lightguide (for example the lightguide 225 illustrated in FIG. 2), the edge optic 550 extends lengthwise along the lightguide to manage emitted light.

As illustrated, the edge optic 550 comprises a cavity 561 that is partially lined with refractive optical features 275 that extend lengthwise (into the page) and that spread or diffuse incident light. In various example embodiments, the refractive optical features 275 can comprise a Blondel array, lenslets, grooves extending lengthwise, convex surfaces, concave surfaces, an irregular pattern, features having a triangular profile, symmetric surfaces, asymmetric surfaces, or some other appropriate profile or geometry. In various example embodiments of the edge optic 550, the refractive optical features 275 may collectively or individually spread, concentrate, focus, diverge, scatter, or otherwise manipulate light.

In some embodiments, the refractive optical features 275 comprise multiple, different forms, which may or may not extend lengthwise. In some example embodiments, the cavity 561 of the edge optic 550 is lined with refractive optical features that extend circumferentially rather than lengthwise. In some example embodiments, the cavity 561 is lined with optical features such as domes or spherical surfaces. In some example embodiments, the cavity 561 is lined with prismatic features.

In the illustrated example embodiment of FIG. 5, while a lower portion of the interior surface of the edge optic 550 is patterned with refractive optical features 275, an upper region 562 is smooth. In other embodiments, the cavity 561 is lined entirely with refractive optical features 275.

The edge optic 550 of FIG. 5 further comprises a lengthwise extending slot 590 that is sized to receive a lightguide edge, for example the edge 255 of the lightguide 225 illustrated in FIG. 2 as discussed above. In some embodiments, the slot 590 is formed to receive a tapered lightguide edge, for example as illustrated in FIG. 3. The slot 490 can comprise a corresponding taper, for example.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting system comprising:
   a lightguide comprising:
      a first face;
      a second face; and
      a light emitting edge that extends between the first face and the second face; and
   a tubular optical element that extends along the light emitting edge and that is coupled to the lightguide, the tubular optical element comprising:
      a diffuser portion having an outer surface, an inner surface opposite to the outer surface, a first end disposed in between the outer surface and the inner surface, and a second end disposed opposite to the first end and in between the outer surface and the inner surface, wherein the inner surface defines a cavity and comprises a plurality of refractive optical features extending along a length of the tubular optical element;
      a first leg that extends into the cavity from the first end of the diffuser portion; and
      a second leg that is substantially parallel to the first leg and extending into the cavity from the second end of the diffuser portion, wherein the first leg and the second leg define a gap therebetween,
         wherein the tubular optical element is flexible such that the gap defined by the first leg and the second leg is pinched in a mechanically relaxed state of the tubular optical element and the gap expands to exert a clamping force by the first and second legs on the lightguide when the lightguide is disposed in the gap in order to couple the tubular optical element to the lightguide,
         wherein an outer surface of the first leg engages a portion of the first face of the lightguide and an outer surface of the second leg engages a portion of the second face of the lightguide such that the light emitting edge of the lightguide faces the inner surface of the diffuser portion, and
         wherein the inner surface of the diffuser portion, an inner surface of the first leg, and an inner surface of the second leg are separated from the light emitting edge of the lightguide by the cavity.

2. The lighting system of claim 1, wherein the tubular optical element is operative to diffuse light.

3. The lighting system of claim 1, wherein the tubular optical element is operative to spread or concentrate light emitted from the light emitting edge of the lightguide to provide illumination.

4. The lighting system of claim 1, wherein the lightguide comprises an optical material disposed between the first face and the second face,
   wherein the cavity of the tubular optical element extends along the light emitting edge of the lightguide, and
   wherein the plurality of refractive optical features are operative to diffuse light that is incident on the inner surface from within the cavity.

5. The lighting system of claim 1, wherein the light emitting edge is tapered.

6. The lighting system of claim 1, wherein the plurality of refractive optical features comprise an array of lenslets extending along the length of the tubular optical element.

7. A lighting system comprising:
   a lightguide that comprises:
      a first internally reflective face formed on a body of optical material;
      a second internally reflective face formed on the body of optical material, opposite the first internally reflective face; and
      a light emitting edge extending on the body of optical material between the first internally reflective face and the second internally reflective face; and
   an edge optic that extends along the light emitting edge that adjoins the first internally reflective surface and the second internally reflective surface and that comprises a cavity extending along the light emitting edge, the edge optic comprising:
      a diffuser portion having an outer surface, an inner surface opposite to the outer surface, a first end disposed in between the outer surface and the inner surface, and a second end disposed opposite to the first end and in between the outer surface and the inner surface, wherein the inner surface defines the cavity;
      a first leg that extends into the cavity from the first end of the diffuser portion; and
      a second leg that is substantially parallel to the first leg and extending into the cavity from the second end of the diffuser portion, wherein the first leg and the second leg define a gap therebetween,
         wherein the edge optic is flexible such that the gap defined by the first leg and the second leg is pinched in a mechanically relaxed state of the edge optic and the gap expands to exert a clamping force by the first and second legs on the lightguide when the lightguide is disposed in the gap in order to couple the edge optic to the lightguide, and wherein the inner surface of the diffuser portion, an inner surface of the first leg, and an inner surface of the second leg are separated from the light emitting edge of the lightguide by the cavity.

8. The lighting system of claim 7, wherein the light emitting edge is tapered.

9. The lighting system of claim 7, wherein the light emitting edge comprises:
   a flat area;
   a first corner formed between the flat area and the first internally reflective face; and
   a second corner formed between the flat area and the second internally reflective face.

10. The lighting system of claim 7, wherein the light emitting edge comprises a rough surface operative to diffuse light passing through the rough surface.

11. The lighting system of claim 7, wherein the light emitting edge is pointed.

12. The lighting system of claim 7, wherein the inner surface of the edge optic comprises a plurality of refractive optical features, and wherein the plurality of refractive optical features comprises an array of Blondel-type lenses.

13. The lighting system of claim 7, wherein the light emitting edge comprises:
   an area;
   a first corner formed between the area and the first internally reflective face; and
   a second corner formed between the area and the second internally reflective face, and
   wherein the edge optic comprises:
   a first leg comprises a flange that extends substantially perpendicular to the first leg and towards the second leg from an end of the first leg, the flange of the first leg extends over the first corner and a first portion of the area when the edge optic is coupled to the lightguide;
   a second leg comprises a flange that extends substantially perpendicular to the second leg and towards the flange of the first leg from an end of the second leg, the flange of the second leg extends over the second corner and a second portion of the area when the edge optic is coupled to the lightguide; and
   the gap disposed between the flange of the first leg and the flange of the second leg, the gap exposing a strip of the area to the cavity.

14. A lighting system comprising:
   a panel of optical material that forms a lightguide and that comprises:
      a first face;
      a second face opposite the first face; and
      an edge that extends between the first face and the second face; and
   an optical element that extends along the edge and comprises a cavity, the cavity comprising an array of optical features extending along a length of the optical element, the optical element comprising:
      a diffuser portion having an outer surface, an inner surface opposite to the outer surface, a first end disposed in between the outer surface and the inner surface, and a second end disposed opposite to the first end and in between the outer surface and the inner surface, wherein the inner surface defines the cavity, and wherein the array of optical features is disposed on the inner surface;
      a first leg that extends into the cavity from the first end of the diffuser portion; and
      a second leg that is substantially parallel to the first leg and extending into the cavity from the second end of the diffuser portion, wherein the first leg and the second leg define a gap therebetween,
         wherein the optical element is flexible such that the gap defined by the first leg and the second leg is pinched in a mechanically relaxed state of the optical element and the gap expands to exert a clamping force by the first and second legs on the lightguide when the lightguide is disposed in the gap in order to couple the optical element to the lightguide, and
         wherein the inner surface of the diffuser portion, an inner surface of the first leg, and an inner surface of the second leg are separated from the edge of the lightguide by the cavity.

15. The lighting system of claim 14, wherein the array faces the edge.

16. The lighting system of claim 14, wherein the array comprises an array of Blondel-type lenses.

17. The lighting system of claim 14, wherein the optical element comprises a diffuser.

18. The lighting system of claim 14, wherein the edge is pointed.

19. The lighting system of claim 14, wherein the array of optical features comprises lenslets.

* * * * *